United States Patent [19]

Sato et al.

[11] Patent Number: 5,675,459
[45] Date of Patent: Oct. 7, 1997

[54] MAGNETORESISTIVE HEAD WITH IMPROVED INSULATION BETWEEN A MAIN ELECTRODE LAYER AND A LOWER SHIELD LAYER

[75] Inventors: Kiyoshi Sato; Minoru Yamada, both of Niigata-ken, Japan

[73] Assignee: Alps Electric Co., Ltd., Tokyo, Japan

[21] Appl. No.: 567,383

[22] Filed: Dec. 4, 1995

[30] Foreign Application Priority Data

Dec. 7, 1994 [JP] Japan .................. 6-331085

[51] Int. Cl.$^6$ .................. G11B 5/39
[52] U.S. Cl. .................. 360/113
[58] Field of Search .................. 360/113, 119, 360/125, 126, 128; 338/32 R; 324/252

[56] References Cited

U.S. PATENT DOCUMENTS

| | | | |
|---|---|---|---|
| 5,351,158 | 9/1994 | Shibata | 360/113 |
| 5,371,643 | 12/1994 | Yuito et al. | 360/113 |
| 5,375,022 | 12/1994 | Gill et al. | 360/113 |
| 5,420,736 | 5/1995 | Heim et al. | 360/113 |
| 5,430,592 | 7/1995 | Yoda | 360/113 |
| 5,435,053 | 7/1995 | Krounbi et al. | 29/603 |
| 5,461,526 | 10/1995 | Hamakawa et al. | 360/113 |
| 5,473,492 | 12/1995 | Terunuma et al. | 360/128 |
| 5,485,334 | 1/1996 | Nix et al. | 360/113 |
| 5,486,968 | 1/1996 | Lee et al. | 360/126 |
| 5,515,221 | 5/1996 | Gill et al. | 360/113 |

FOREIGN PATENT DOCUMENTS 6-223332 8/1994 Japan.

*Primary Examiner*—Jefferson Evans
*Attorney, Agent, or Firm*—Guy W. Shoup; Patrick T. Bever

[57] ABSTRACT

The electrical insulation performance between a lower shield layer and a main electrode layer is improved in a magnetoresistive head using a magnetoresistive element. A lower gap layer made of alumina is formed on the surface of the lower shield layer, and an MR element, a longitudinal bias layer, and an upper gap layer are formed thereon. In a portion facing a magnetic medium, the MR element, the longitudinal bias layer, and the gap layers appear between the lower shield layer and the upper shield layer, and the gap length GL is determined by the lower gap layer and the upper gap layer. In the portion other than the portion facing the magnetic medium, the lower gap layer and the upper gap layer are interposed between the main electrode layer and the lower shield layer, and the main electrode layer is connected to the longitudinal bias layer through the upper gap layer. The two gap layers are interposed between the main electrode layer and the lower shield layer, and the electrical insulation performance between the main electrode layer and the lower shield layer is improved.

6 Claims, 7 Drawing Sheets

1

MAGNETORESISTIVE HEAD WITH IMPROVED INSULATION BETWEEN A MAIN ELECTRODE LAYER AND A LOWER SHIELD LAYER

BACKGROUND OF THE INVENTION

1. Field of the Invention

The present invention relates to a magnetoresistive head using magnetoresistive elements disposed in a magnetic reading section of a floating magnetic head or the like and, more particularly, to a magnetoresistive head having increased insulation performance between a main electrode layer and a shield layer.

2. Description of the Related Art

FIG. 6 is a sectional view in which a trailing end portion of a floating magnetic head used in a hard disk unit or the like is enlarged.

Reference numeral 1 denotes a slider of a floating magnetic head. The right side in the figure is a surface (ABS: Air Bearing Surfaces) facing a magnetic medium, such as a hard disk, is in the Z direction. A magnetoresistive head H is stacked on the trailing end surface 1b of the slider 1. The magnetoresistive head H is formed in such a way that a reproduction head layer H1 is stacked on a recording head layer H2.

In the reproduction head layer H1, a magnetoresistive element (MR element) 4 and a main electrode layer 5 are formed between a lower shield layer 2 and an upper shield layer 3, such as a Sendust (Fe—Al—Si alloy) or a Permalloy (Fe—Ni alloy). The gap length of the reproduction head layer H1 is indicated by GL. In the rear portion (B portion) of the magnetoresistive head H, an electrode lead-out layer 6 is connected to the main electrode layer 5.

In the recording head layer H2, an upper core layer 7 is formed above the upper shield layer 3, a coil layer 8 is provided which is helically formed in a plane with a connection portion 7a between the upper shield layer 3 and the upper core layer 7 substantially in the center of the coil layer 8, and thus an inductive magnetic head is formed. The gap length of the recording head layer H2 is indicated by GLw.

FIG. 7 is an enlarged sectional view of the portion of the reproduction head layer Hi shown in FIG. 6. The right side in the figure shows the A portion of FIG. 6, and the left side in the figure shows the B portion. FIGS. 8 and 9 are enlarged views when the reproduction head layer H1 is seen from the facing portion (Y direction) of the magnetic medium. FIGS. 8 and 9 show different methods of applying a longitudinal bias magnetic-field to the magnetoresistive element (MR element) 4. FIG. 8 shows a hard bias method, and FIG. 9 shows an exchange bias method.

As shown in FIG. 7, in the A portion, a lower gap layer 11 formed from an electrical insulating material, such as alumina ($Al_2O_3$), is formed on the surface of the lower shield layer 2 made of Sendust or the like, and the magnetoresistive element (MR element) 4 and a longitudinal bias layer 9 are formed on the lower gap layer 11. The main electrode layer 5 is connected onto the longitudinal bias layer 9, and a detected electric current is supplied to the MR element 4 via the longitudinal bias layer 9. In a region where the MR element 4 and the longitudinal bias layer 9 are not formed, the main electrode layer 5 is stacked on the lower gap layer 11. An upper gap layer 12 formed from an electrical insulating material, such as alumina, is formed on the MR element 4, the longitudinal bias layer 9, and further on the main electrode layer 5.

2

In the portion (the ABS) other than the portion facing the magnetic medium, an organic insulating layer 13 is formed on the upper gap layer 12, and the base formed surface of the upper shield layer 3 is smoothed. The upper shield layer 3 is formed on the organic insulating layer 13 and the upper gap layer 12. As shown in FIG. 7, in the upper shield layer 3, a base film 3a made of a Permalloy or the like is previously sputtered, and a Permalloy is plated on the base film 3a.

As shown in FIG. 6, the range of the upper shield layer 3 is limited to the area where the coil layer 8 of the recording head layer H2 is formed, but the main electrode layer 5 extends in the left direction in the figure in the B portion, the electrode lead-out layer 6 is connected to the main electrode layer 5. The electrode lead-out layer 6 is formed from an electroconductive material. For example, a Permalloy which is the same material as the upper shield layer 3 is used as an electroconductive material. The electrode lead-out layer 6 is formed in such a way that a base film 6a made of a Permalloy or the like is sputtered, and a Permalloy is plated thereon.

As shown in FIGS. 8 and 9, the MR element 4 has a three-layer structure such that the following is stacked in sequence from the bottom in the figure: a soft magnetic layer (SAL layer) 4a, a non-magnetic material layer (SHUNT layer) 4b, and a magnetoresistive thin-film (MR thin film) 4c. The SAL layer 4a is formed from an Fe—Ni alloy or a CO—Zr—Mo alloy; the SHUNT layer 4b is formed from Ta; and MR thin film 4c is formed from an Fe—Ni alloy.

In the hard bias method shown in FIG. 8, longitudinal bias layers 9 and 9 are hard bias layers and contain a Co—Cr—Ta alloy as the main substance. In the exchange bias method shown in FIG. 9, longitudinal bias layers 9 and 9 are anti-ferromagnetic layers formed from an Fe—Mn alloy or the like. In FIGS. 8 and 9, the track width is indicated by Tw.

As shown in FIGS. 8 and 9, on the surface (ABS surface) facing the magnetic medium, the lower shield layer 2, the lower gap layer 11, the MR element 4, and the longitudinal bias layer 9, and the upper gap layer 12 and the upper shield layer 3 (including the base film 3a) appear. The gap length GL is determined on the basis of the spacing dimension between the lower shield layer 2 and the upper shield layer 3 in the portion where the MR element 4 is provided. Normally, a spacing G1 between the center of the MR thin film 4c and the lower shield layer 2 is equal to a spacing G2 between the center of the MR thin film 4c and the upper shield layer 3.

Since, as described above, the lower gap layer 11 and the upper gap layer 12 determine the gap length GL of the reproduction head layer H1, in the portion, shown in FIGS. 8 and 9, facing the magnetic medium, the lower gap layer 11 and the upper gap layer 12 must be formed so as to sandwich the MR element 4 and the longitudinal bias layer 9. Therefore, in the area where the MR element 4 and the longitudinal bias layer 9 are not formed, the main electrode layer 5 is forced to be sandwiched between the lower gap layer 11 and the upper gap layer 12.

The detected electric current is supplied from the main electrode layer 5 through the longitudinal bias layer 9 to the MR element 4. In order to obtain reproduction output from the magnetic medium on the basis of the detected electric current, it is necessary that the main electrode layer 5 be magnetically shielded from the external magnetic field, and electrically insulated. The magnetic shield is effected by the lower shield layer 2 and the upper shield layer 3.

As regards electrical insulation, since the upper gap layer 12 and the organic insulating layer 13 are formed on the upper layer side of the main electrode layer 5, electrical insulation between the main electrode layer 5 and the upper shield layer 3 can be sufficiently secured. However, only one lower gap layer 11 is provided between the main electrode layer 5 and the lower shield layer 2. As shown in FIG. 6, in an actual magnetic head, the MR element 4 and the longitudinal bias layer 9 are very small, and in comparison with this, the area where the main electrode layer 5 is formed is very large. Since only the lower gap layer 11 is formed between the main electrode layer 5 formed in this wide region and the lower shield layer 2, that portion of the entire reproduction head layer H1 where electrical insulation failure is most likely to occur is the portion at which the main electrode layer 5 faces the lower shield layer 2.

If a film thickness d1 of the lower gap layer 11 can be made as thick as desired, no problem with electrical insulation between the main electrode layer 5 and the lower shield layer 2 occurs. However, the film thickness d1 of the lower gap layer 11 and the film thickness d2 of the upper gap layer 12 are determined on the basis of the gap length GL (G1 and G2). In recent years, recording signals of a magnetic medium are becoming increasingly high in density, and the required gap length GL is getting shorter year by year. For example, in order for a hard disk to have a high capacity of 600 to 700 Megabytes, the gap length GL becomes a very small dimension of about 0.25 μm. As the gap length GL becomes shorter, the film thicknesses d1 and d2 of the respective gap layers 11 and 12 inevitably become small.

It is extremely difficult to surely achieve electrical insulation between the main electrode layer 5 and the lower shield layer 2 in a wide area by only the lower gap layer 11, which is a very thin film. The lower shield layer 2 is hitherto formed from a Sendust or the like. The surface roughness of a material, such as a Sendust, when it is formed into a film by sputtering, is quite large. When the lower gap layer 11 having a very thin film thickness d1 is formed on the surface of the lower shield layer 2 having such inferior surface smoothness, pinholes are likely to be formed on the lower gap layer 11. The lower gap layer 11 thereby decreases the reliability of electrical insulation between the main electrode layer 5 and the lower shield layer 2, and the failure rate is increased.

In the B portion shown in FIG. 7, the electrode lead-out layer 6 and the main electrode layer 5 are connected to each other. In the conventional layer structure, however, the upper gap layer 12 is positioned on the main electrode layer 5. Since the lower gap layer 11 and the upper gap layer 12 are exposed in the portion facing the magnetic medium, they are formed from a hard material, such as alumina. Therefore, in order to connect the electrode lead-out layer 6 to the main electrode layer 5 in the B portion, the upper gap layer 12 of a hard material must be removed partially by ion milling. Since a hole must be formed by ion milling so that it surely reaches the main electrode layer 5 and the main electrode layer 5 is not removed excessively, processing operations are difficult.

SUMMARY OF THE INVENTION

The present invention solves the above-described problems of the prior art. It is an object of the present invention to provide a magnetoresistive head capable of surely achieving electrical insulation between an electrode layer and a lower shield layer even if the gap length becomes short.

It is another object of the present invention to make it easy to form a connection portion between an electrode lead-out layer and a main electrode layer.

To achieve the above-described object, according to the present invention, there is provided a magnetoresistive head comprising: a lower shield layer, an upper shield layer, a magnetoresistive element containing a thin film having a magnetoresistive effect, a bias layer for supplying a bias to the thin film, a main electrode layer for supplying detected electric current to the magnetoresistive element, a lower gap layer which appears between the magnetoresistive element and the lower shield layer in the portion facing a magnetic medium, and an upper gap layer which appears between the magnetoresistive element and the upper shield layer in the portion facing the magnetic medium, wherein the lower gap layer and the upper gap layer are formed between the main electrode layer and the lower shield layer, and the main electrode layer is brought into electrical conduction with the magnetoresistive element through the upper gap layer.

In the above description, the bias layer supplies a longitudinal bias magnetic field to a magnetoresistive thin film inside the magnetoresistive element, and examples of the bias layer are a hard bias layer, and an exchange bias layer. The main electrode layer is connected to the electroconductive layer stacked on the bias layer or the bias layer through the upper gap layer, and the main electrode layer is brought into electrical conduction with the magnetoresistive element through the bias layer or the electroconductive layer.

In the above description, in order to secure the smoothness of the surface of the lower shield layer, it is preferable that the lower shield layer be formed from an iron-based fine-crystalline alloy, in particular, a soft magnetic alloy having Fe as the main constituent, and one or more carbide crystals which are selected from a group of metals consisting of Ti, Zr, Hf, V, Nb, Ta, Mo, and W, and having an average crystalline particle diameter of 40 nm or less.

Also, it is preferable that an organic insulation layer be formed on the main electrode layer, and an electrode lead-out layer formed on the organic insulation layer be connected to the main electrode layer through the organic insulation layer. More preferably, the organic insulation layer should be formed from a photosensitive insulating material.

In the above-described means, in the portion facing a magnetic medium, a lower gap layer and an upper gap layer appear at a position at which a magnetoresistive element is sandwiched therebetween, and the thickness of the two gap layers is a factor which determines the gap length GL. In the region where the magnetoresistive element and the bias layer are not formed, the lower gap layer and the upper gap layer are formed stacked on the lower shield layer, and a main electrode layer is formed thereon. Therefore, at least two layers of the lower gap layer and the upper gap layer are interposed between the lower shield layer and the main electrode layer. Even if, for example, the gap length GL becomes short, and the film thickness dimension of each gap layer is decreased, the spacing between the lower shield layer and the main electrode layer can be increased more than in the prior art, and the reliability of electrical insulation between the main electrode and the lower shield layer can be increased. Also, the main electrode layer is formed on the upper gap layer; however, in the portion where the magnetoresistive element is provided, the main electrode layer is connected to the bias layer through the upper gap layer, and the main electrode layer and the magnetoresistive element layer are brought into electrical conduction with each other.

The section between the main electrode layer and the upper shield layer is electrically insulated by an insulation layer formed from an organic material. That is, in the portion facing the magnetic medium, the upper gap layer is in contact with the upper shield layer, and inside the film, the main electrode layer and the upper shield layer are electrically insulated by an insulation layer. In the region where the main electrode layer and the upper shield layer are insulated by the insulation layer, the main electrode layer is connected to the bias layer through the upper gap layer.

When the lower shield layer is formed from an Fe-based fine-crystalline alloy, such as an Fe—Ta—C alloy, in particular, an iron-based fine-crystalline alloy having Fe as the main constituent, and one or more carbide crystals which are selected from a group of metals consisting of Ti, Zr, Hf, V, Nb, Ta, Mo, and W, and having an average crystalline particle diameter of 40 nm or less, the surface of the lower shield layer can be smoothed, and pinholes of the lower gap layer formed on the lower shield layer are not likely to occur, thereby increasing the reliability of electrical insulation between the main electrode layer and the lower shield layer.

In the portion where an electrode lead-out layer is provided, since an insulation layer of an organic insulating material is provided on the main electrode layer, the electrode lead-out layer can be easily connected to the main electrode layer via the insulation layer. In a case where the organic material from which the insulation layer is formed is a photosensitive material, a hole can be formed in the insulation layer in exposure and development processes, and the electrode lead-out layer can be connected to the main electrode layer via this hole.

The above and further objects, aspects, and novel features of the invention will become more fully apparent from the following detailed description when read in connection with the accompanying drawings.

DETAILED DESCRIPTION OF THE PREFERRED EMBODIMENTS

Preferred embodiments of the present invention will be described below with reference to the accompanying drawings.

Figure 1:
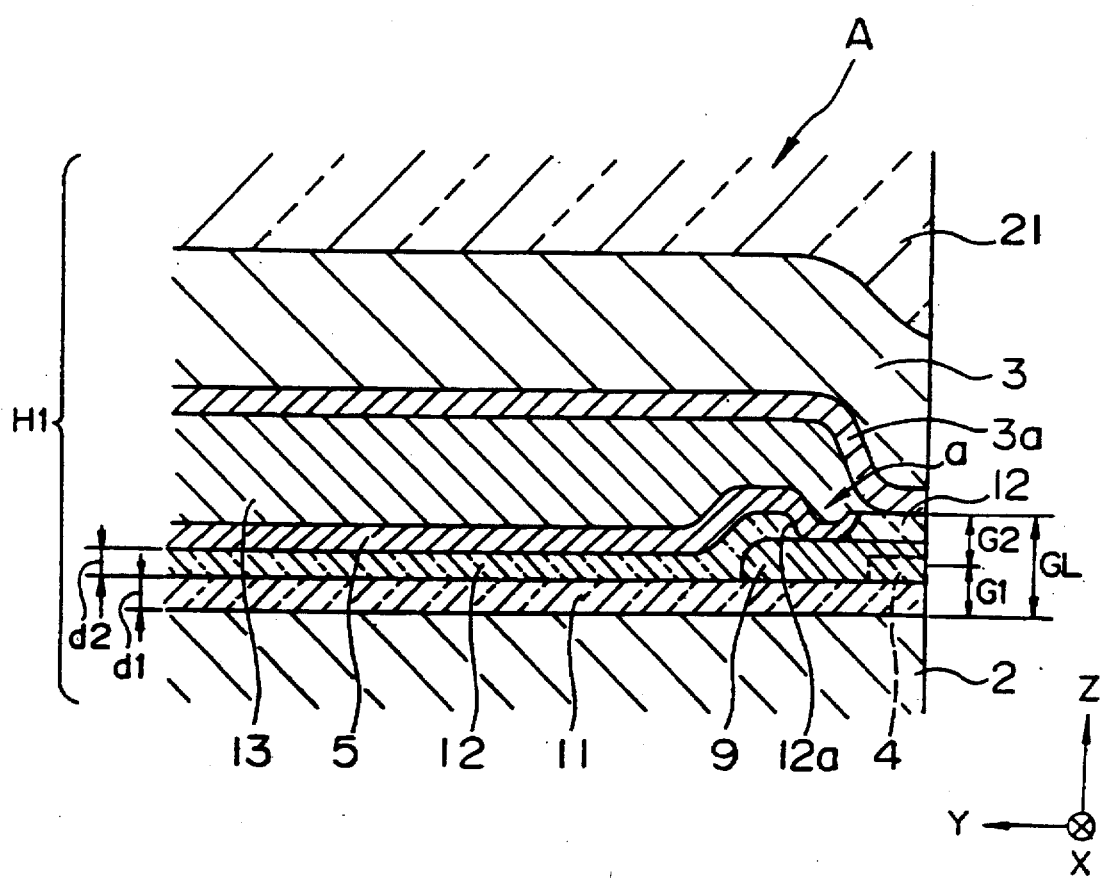
FIG. 1 shows the construction of a magnetoresistive head in accordance with an embodiment of the present invention, and is an enlarged sectional view of the A portion in FIG. 6.
Figure 2:
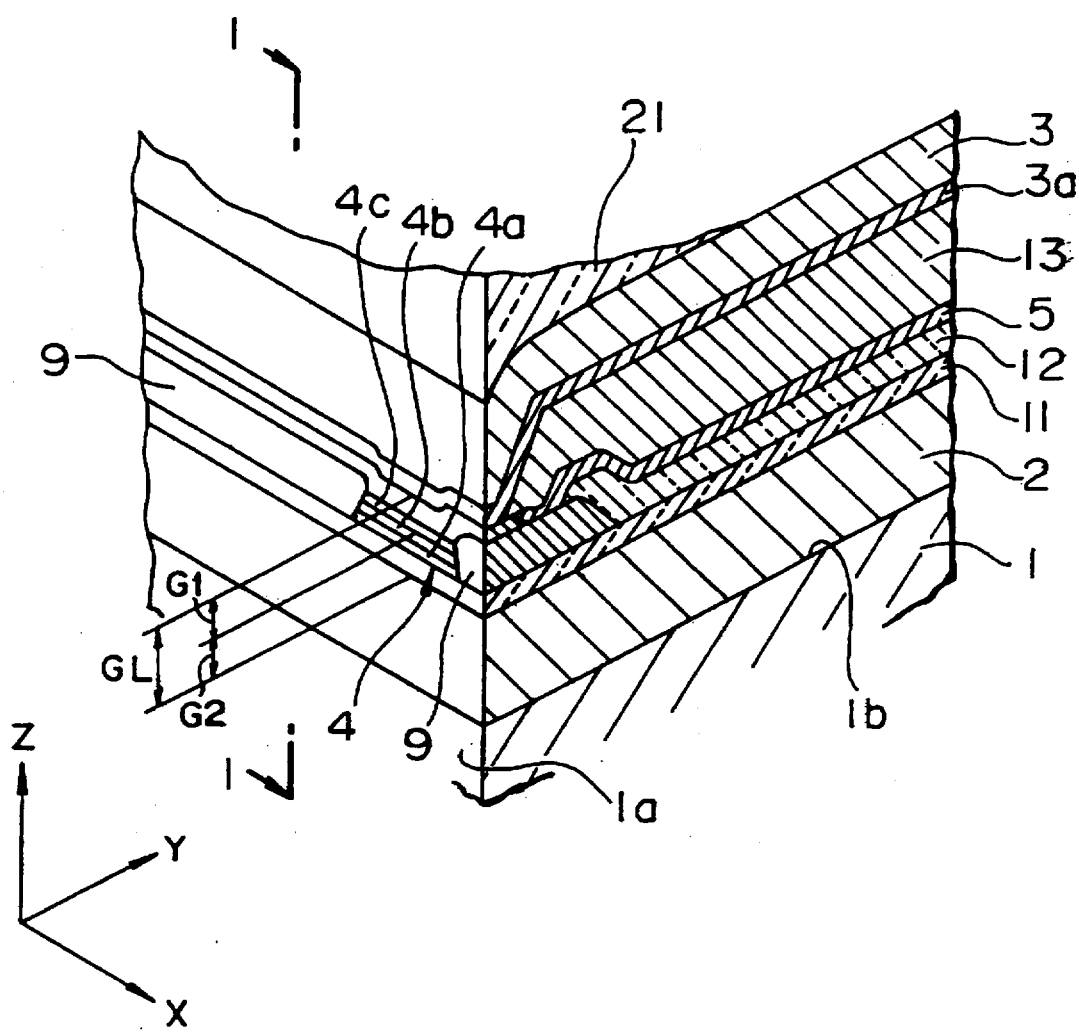
FIG. 2 is a sectional perspective view illustrating the cross section of the magnetoresistive head shown in FIG. 1 and the surface facing a magnetic medium.
Figure 3:
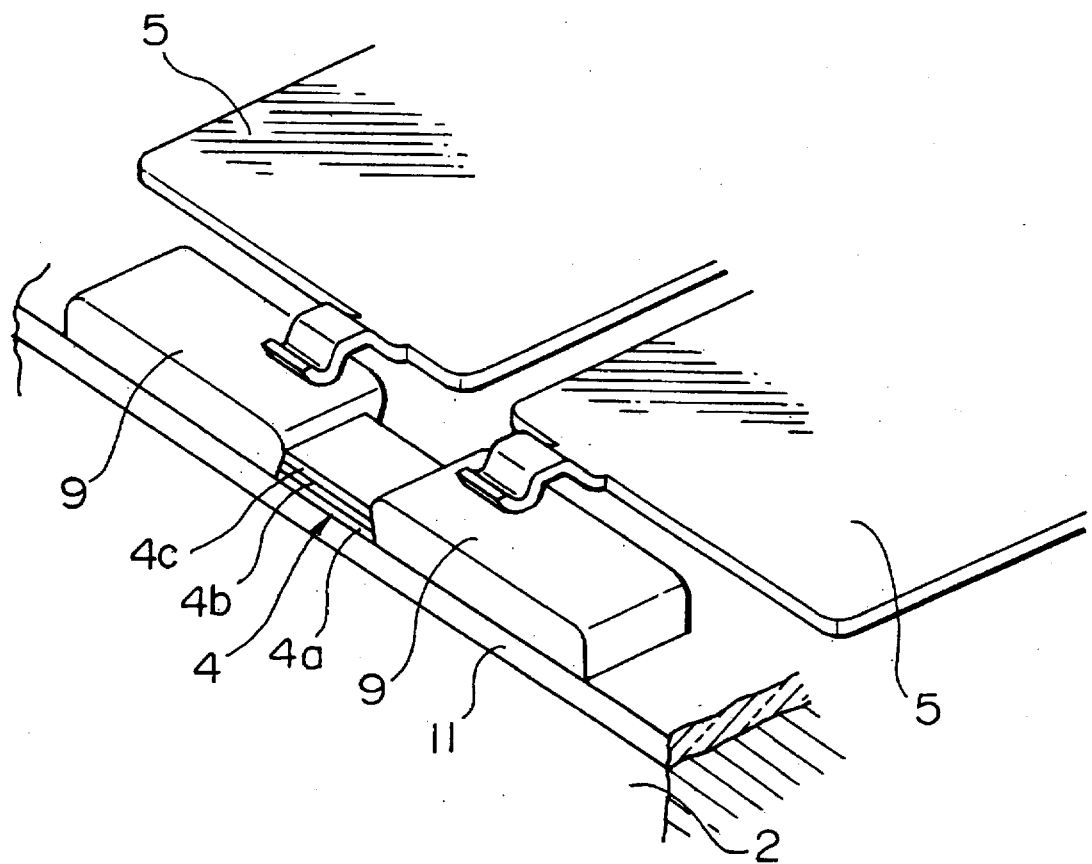
FIG. 3 is a perspective view illustrating an MR element, a longitudinal bias layer, and a main electrode layer of the magnetoresistive head shown in FIG. 2.
Figure 4:
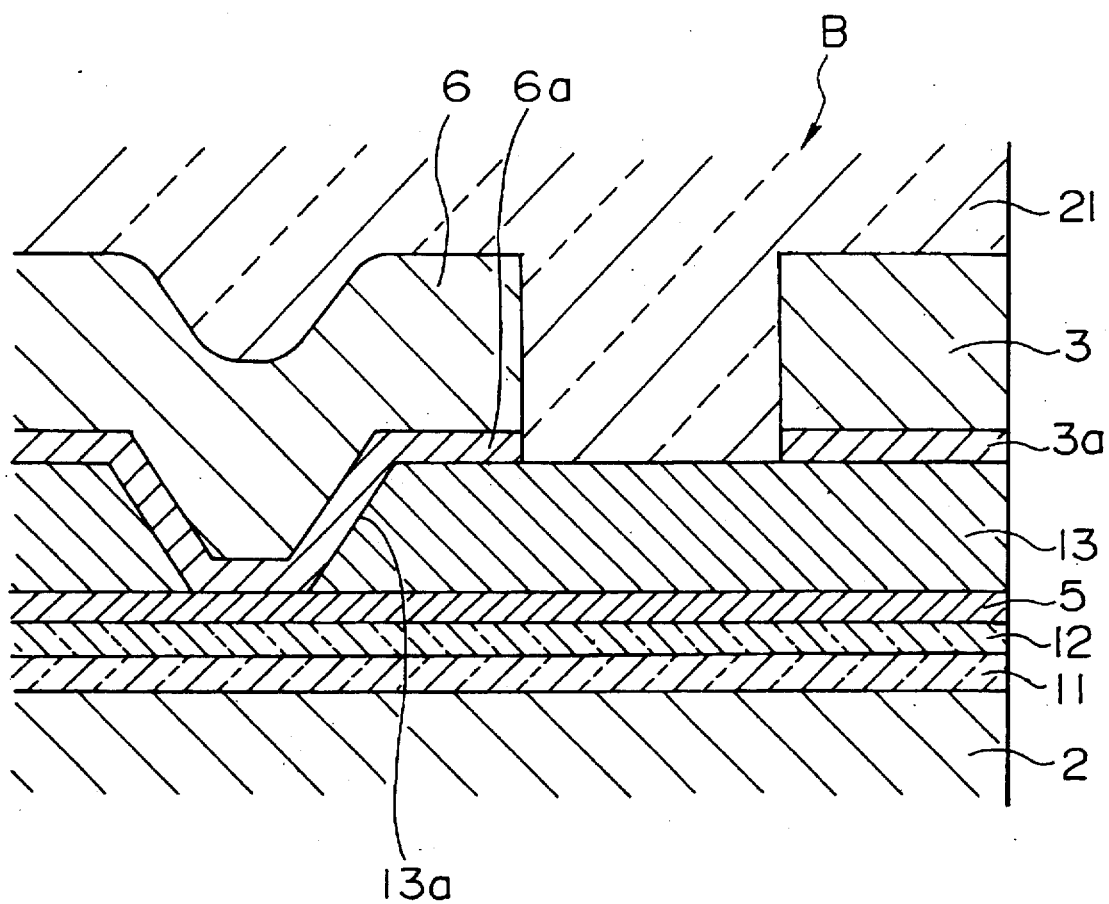
FIG. 4 is an enlarged sectional view of the B portion of FIG. 6.
Figure 6:
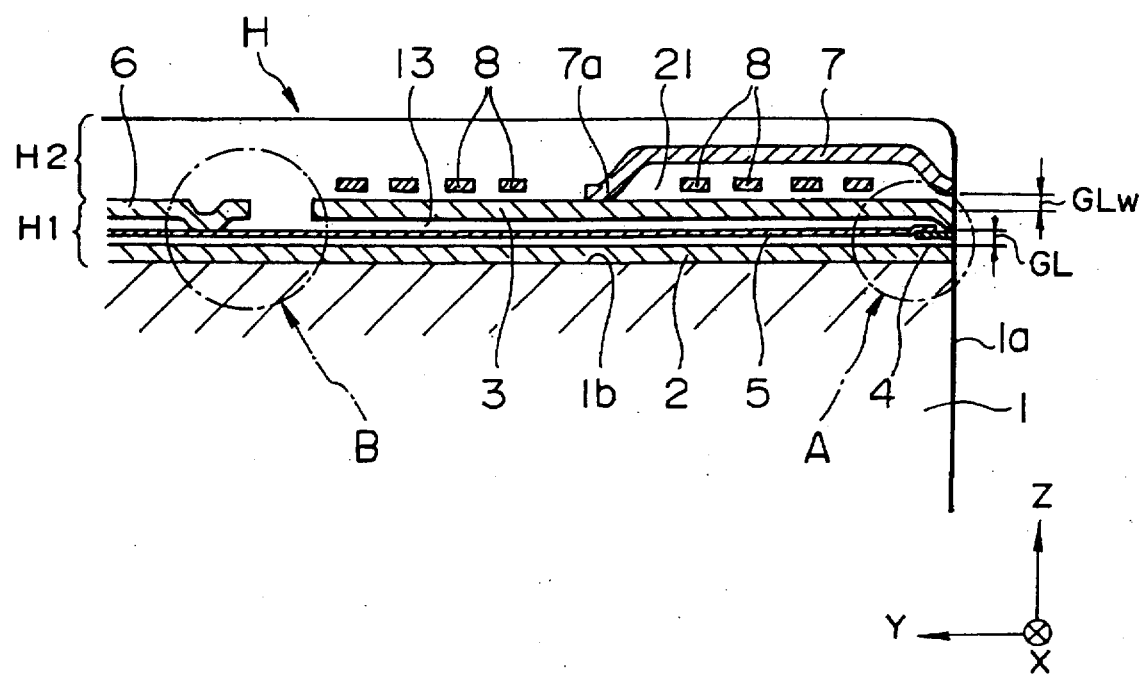
FIG. 6 shows the entire construction of the magnetoresistive head, and is a sectional view of the trailing end surface of a floating magnetic head.

FIG. 1 shows a magnetoresistive head in accordance with an embodiment of the present invention, and is an enlarged sectional view of the A portion in FIG. 6. FIG. 2 is a sectional perspective view illustrating the cross section in the A portion of the thin-film magnetic head. FIG. 1 is a sectional view taken along the line 1—1 of FIG. 2. FIG. 3 is a perspective view illustrating only an magnetoresistive element, a longitudinal bias layer, and a main electrode layer which constitute the magnetoresistive head. FIG. 4 is an enlarged sectional view of the B portion of the magnetoresistive head in FIG. 6.

The entire construction of the magnetoresistive head H is shown in FIG. 6. The ABS surface 1a of the slider 1 of the floating magnetic head faces a magnetic medium, such as a hard disk. The movement direction of the magnetic medium is in the Z direction. FIGS. 1 and 2 show the construction of the reproduction head layer H1. In FIG. 1, the surface facing the magnetic medium is on the right side of the figure, and, in FIG. 2, the surface facing the magnetic medium appears obliquely on the left side.

The lower shield layer 2 is formed on the trailing end surface 1b of the slider 1. In this embodiment, the lower shield layer 2 is formed from an iron-based fine-crystalline alloy. This fine-crystalline alloy is an alloy formed of a crystal having Fe as the main constituent, and one or more carbide crystals selected from the group of metals consisting of Ti, Zr, Hf, Nb, Ta, Mo, and W, and having an average crystalline particle diameter of 40 nm or less. Al, Si, Ru, Rh, Pt, Ir, and/or Pd are added thereto as necessary in order to adjust the magnetostriction, improve the resistance to corrosion, and adjust the resistivity. This fine-crystalline alloy is obtained by forming an amorphous thin film on the trailing end surface 1b of the slider 1 by a RF sputtering apparatus or the like and annealing it. The iron-based fine-crystalline alloy has a very small surface roughness on the surface of the formed film, and a smooth surface can be obtained.

Figure 8:
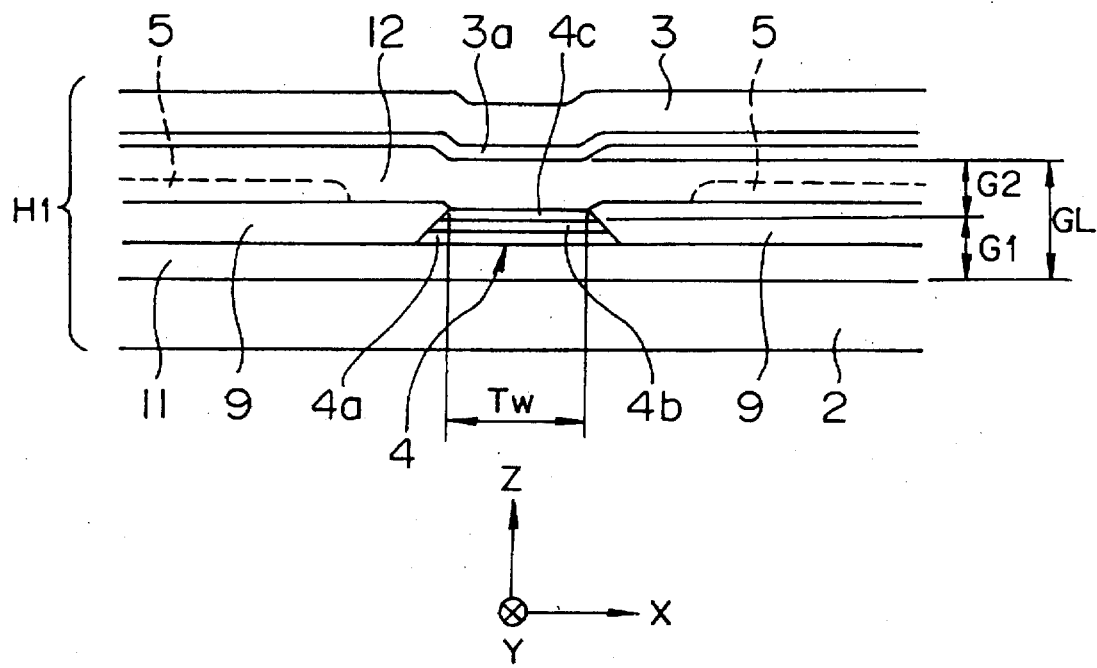
FIG. 8 is an enlarged view illustrating the magnetoresistive head employing a hard bias method when the magnetoresistive head is viewed from the surface facing the magnetic medium.
Figure 9:
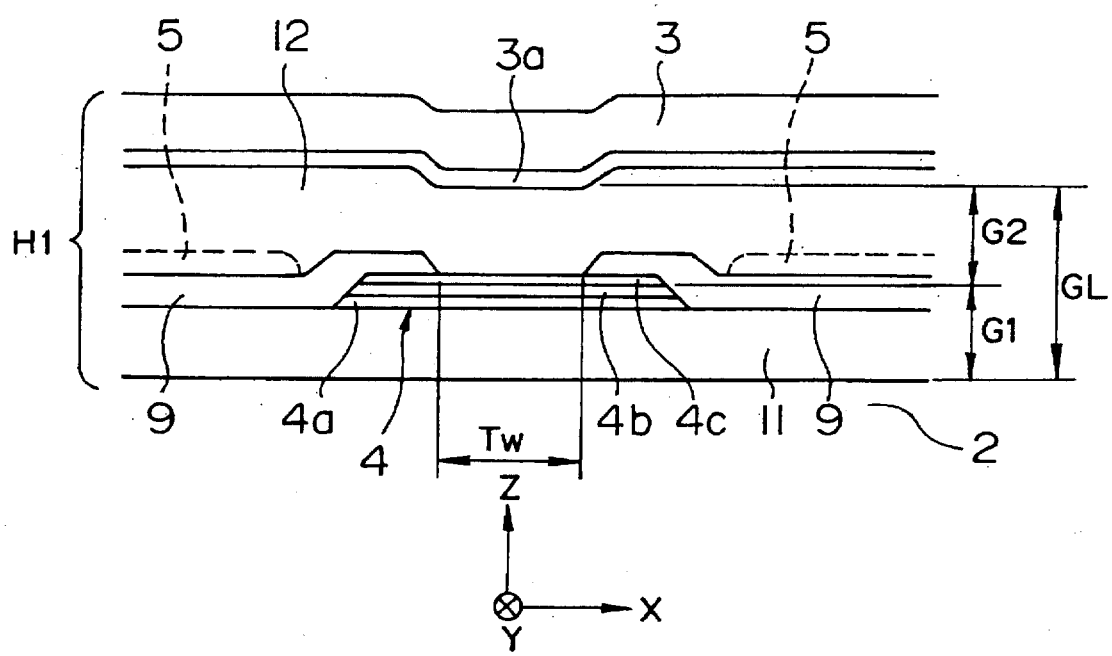
FIG. 9 is an enlarged view illustrating the magnetoresistive head employing an exchange bias method when the magnetoresistive head is viewed from the surface facing the magnetic medium.

The lower gap layer 11 is formed on the above-mentioned smooth surface of the lower shield layer 2. The lower gap layer 11 has magnetic and electrical insulating properties, and is formed from alumina ($Al_2O_3$) or the like. As shown in FIG. 1, in the portion (the A portion) facing the magnetic medium, the magnetoresistive element (MR element) 4 is stacked on the lower gap layer 11, and the longitudinal bias layer 9 is stacked on both sides of the MR element 4. As shown in FIGS. 8 and 9, the MR element 4 has a three-layer structure such that the following is stacked in sequence from the bottom: a soft magnetic layer (SAL layer) 4a formed from an Fe—Ni (iron—nickel) alloy or a Co—Zr—Mo (cobalt—zirconium—molybdenum) alloy, a non-magnetic material layer (SHUNT layer) 4b formed from Ta (tantalum), and a magnetoresistive thin-film (MR thin film) 4c formed from an Fe—Ni alloy (Permalloy) which exhibits a magnetoresistive effect.

The longitudinal bias layer 9 is provided on both sides of the MR element 4. In the hard bias method shown in FIG. 8, the longitudinal bias layer 9 is a hard bias layer, and is formed from a Co—Cr—Ta (cobalt—chromium—tantalum) alloy. In the exchange bias method shown in FIG. 9, the longitudinal bias layer 9 is an anti-ferromagnetic layer of an Fe—Mn (iron—manganese) alloy.

As shown in FIGS. 1 and 2, in this embodiment, the upper gap layer 12 is formed on the MR element 4 and the longitudinal bias layer 9. The upper gap layer 12 is formed from the same material, for example, alumina, as that of the lower gap layer 11. The main electrode layer 5 is stacked on the upper gap layer 12. The main electrode layer 5 is formed from a conductive material, such as Cu (copper) or W (tungsten), having a small electrical resistance.

In the conductive portion indicated by (a) in FIG. 1, an etching hole 12a formed by ion milling is formed in the upper gap layer 12. The main electrode layer 5 is connected to the longitudinal bias layer 9 through the etching hole 12a. When the longitudinal bias layer 9 is a hard bias layer, a Cr layer and a Ta layer are formed on a Co—Cr—Ta alloy; when the longitudinal bias layer 9 is an exchange bias layer, a Ta layer and a W (tungsten) layer are formed on an Fe—Mn alloy. The detected electric current which flows into the main electrode layer 5 is supplied through each of the material layers of the longitudinal bias layer to the MR element 4.

The organic insulating layer 13, which is formed from an organic insulating material, is formed on the main electrode layer 5. In this embodiment, the organic insulating layer 13 is a photosensitive material, such as a novolak resin or a photosensitive polyimide resin, which is used as a resist material. The organic insulating layer 13 is formed in the portion where it is not exposed to the ABS surface 1a and in the range where most of the formation region of the main electrode layer 5 can be covered. The organic insulating layer 13 is coated by a spin coat method and is calcined. The top surface thereof is a smooth surface. That is, the organic insulating layer 13 is called a volume layer, and the irregularities of the layers under the organic insulating layer 13 are corrected.

As shown in FIG. 6, the upper shield layer 3 is partially formed on the organic insulating layer 13. In this film formation process, a Permalloy or the like is first sputtered on the surface of the organic insulating layer 13, and thus the base film 3a is formed. A Permalloy or the like is plated thereon, and thus the upper shield layer 3 is formed. A gap layer 21 made of alumina or the like is formed on the upper shield layer 3, and, as shown in FIG. 6, the coil layer 8 and the upper core layer 7, which constitute the inductive head layer (the recording head layer H2), are formed on the gap layer 21.

Figure 7:
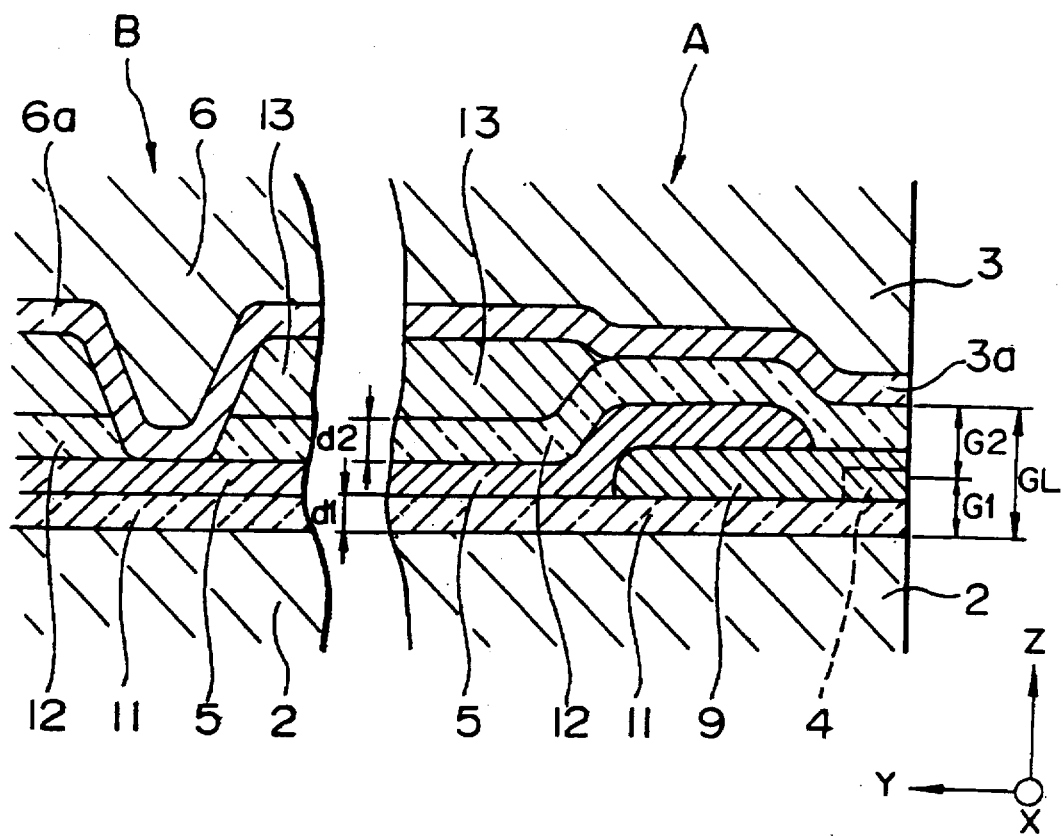
FIG. 7 is a sectional view in which the A portion is enlarged, and illustrates a conventional magnetoresistive head.

As shown in FIGS. 1 and 2, in this embodiment, in the portion (the facing surface: the ABS surface) facing the magnetic medium, the lower gap layer 11 appears between the MR element 4 and the lower shield layer 2, and the upper gap layer 12 appears between the MR element 4 and the upper shield layer 3 (including the base film 3a). In the same manner as in the prior art shown in FIG. 7, the gap length GL is determined on the basis of the film thicknesses d1 and d2 of the respective lower gap layers 11 and 12. That is, the gap length GL is determined on the basis of the spacing G1 between the MR thin film 4c and the lower shield layer 2, and the spacing G2 between the MR thin film 4c and the upper shield layer 3 (including the base film 3a). The following appears in the portion facing the magnetic medium: the lower shield layer 2, the lower gap layer 11, the MR element 4, the upper gap layer 12, and the upper shield layer 3.

However, in the portion where the MR element 4 and the longitudinal bias layer 9 are not formed, two insulating layers of the lower gap layer 11 and the upper gap layer 12 are interposed between the main electrode layer 5 and the lower shield layer 2. As shown in FIGS. 3 and 6, the main electrode layer 5 is formed in a very wide area in comparison with the formation area of the MR element 4. However, since the two insulating layers are formed between the main electrode layer 5 having a large area and the lower shield layer 2, the reliability of electrical insulation between the main electrode layer 5 and the lower shield layer 2 is improved considerably more than that of the prior art.

Also, as described above, since the lower shield layer 2 is formed from an iron-based fine-crystalline alloy and the surface thereof is smooth, even if the film thickness d1 of the lower gap layer 11 formed on the lower shield layer 2 is small, pinholes are not likely to occur, and thus the insulation performance of the lower gap layer 11 can be increased.

Since, as described above, the lower gap layer 11 can be made to have a high insulation performance and the lower gap layer 11 and the upper gap layer 12 are interposed between the main electrode layer 5 and the lower shield layer 2, the reliability of electrical insulation of the main electrode layer 5 is increased considerably. As described above, when the magnetic medium, such as a hard disk, is recorded at a high density, the required gap length GL becomes short, and the film thicknesses d1 and d2 (factors which determine the gap length GL) of the respective gap layers 11 and 12 become small. Even if the film thicknesses d1 and d2 are made small, there is no risk in that the electrical insulation property between the main electrode layer 5 and the lower shield layer 2 is decreased less than in the prior art.

Regarding the electrical insulation between the main electrode layer 5 and the upper shield layer 3, the organic insulating layer 13 is interposed between the main electrode layer 5 and the upper shield layer 3. Also, in the conductive portion, indicated by (a) in FIG. 1, between the main electrode layer 5 and the longitudinal bias layer 9, the organic insulating layer 13 is interposed between the main electrode layer 5 and the upper shield layer 3. Therefore, there is no problem with the electrical insulation between the main electrode layer 5 and the upper shield layer 3.

As shown in FIG. 6, the main electrode layer 5 extends toward the inner portion of the film from the portion where the upper shield layer 3 is formed, and is connected to the electrode lead-out layer 6 in the B portion. As shown in FIG. 4, in this embodiment, also in the B portion, the organic insulating layer 13 is formed on the main electrode layer 5, and the electrode lead-out layer 6 is connected to the main electrode layer 5 through a through hole 13a formed in the organic insulating layer 13.

The organic insulating layer 13, as has already been stated, is formed from a novolak resin or a photosensitive polyimide resin, which is a resist material. Therefore, it is possible to form the through hole 13a in very simple steps, such as exposure and development processes. It is also possible to surely make the plated base film 6a of the electrode lead-out layer 6 contact with the main electrode layer 5 through the through hole 13a.

Figure 5:
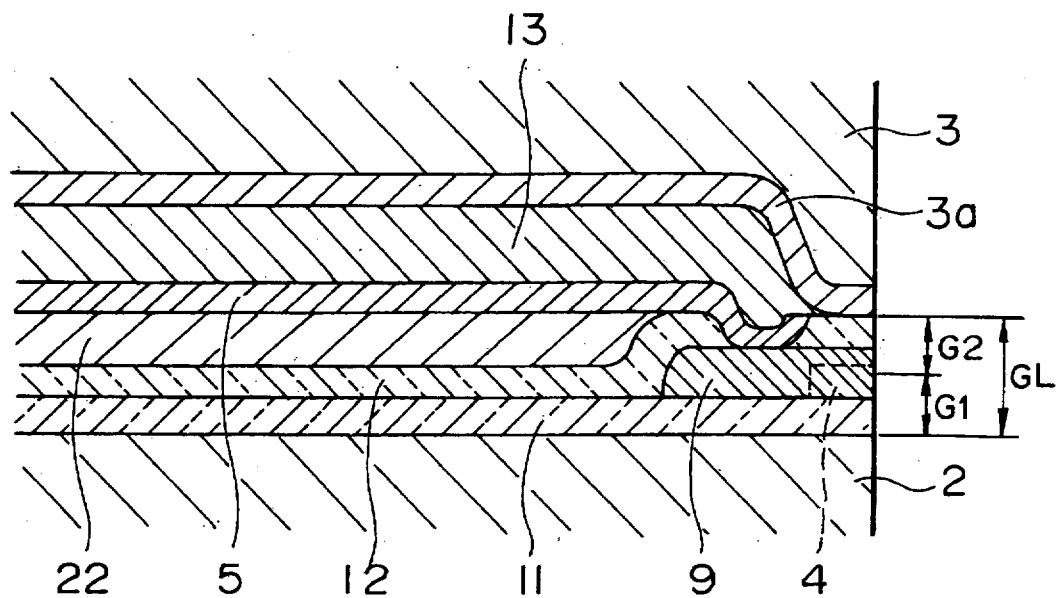
FIG. 5 is a sectional view in which the A portion is enlarged, and illustrates another embodiment of the present invention.

FIG. 5 shows a second embodiment of the present invention, and is a sectional view of the A portion, similar to FIG. 1. In the embodiment shown in FIG. 5, after the lower gap layer 11 and the upper gap layer 12 are formed on the lower shield layer 2, another insulating layer 22 for correcting irregularities of the upper gap layer 12 is formed. The insulating layer 22 is formed from the same organic material, preferably a photosensitive material, as that of the organic insulating layer 13. Since the main electrode layer 5 is formed on the insulating layer 22, the thickness dimension of the insulating layer between the main electrode layer 5 and the lower shield layer 2 becomes greater, thereby improving the reliability of the electrical insulation between the main electrode layer 5 and the lower shield layer 2.

In the embodiment shown in FIG. 5, only the lower shield layer 2, the lower gap layer 11, the MR element 4, the upper gap layer 12, and the upper shield layer 3 appear in the portion facing the magnetic medium. FIG. 5 shows the same elements as those shown in FIGS. 1 and 7, and the factors for setting the gap length GL are the same.

The magnetoresistive head of the present invention is not limited to the floating magnetic head for a hard disk, but may be used as any head which is required to detect a magnetic flux which leaks from a magnetic medium, for example, as a magnetic head for only reproduction or for a magnetic sensor.

As has been described up to this point, according to the present invention, since at least a lower gap layer and an upper gap layer are formed between a lower shield layer and a main electrode layer, it is possible to increase the electrical insulation performance between the main electrode layer formed in a wide area and the lower shield layer.

Also, since the lower shield layer is formed from an iron-based fine-crystalline material, the surface roughness of the lower shield layer is small and a smooth surface can be obtained. Thus, pinholes are not likely to occur in the lower gap layer to be formed thereon, and insulation performance can be increased even more.

In addition, when an organic insulation layer is formed on the main electrode layer, and the electrode lead-out layer and the main electrode layer are connected to each other via the organic insulation layer, processing of the connection portion of the main electrode layer becomes easy.

Many different embodiments of the present invention may be constructed without departing from the spirit and scope of the present invention. It should be understood that the present invention is not limited to the specific embodiments described in this specification. To the contrary, the present invention is intended to cover various modification and equivalent arrangements included within the spirit and scope of the invention as hereafter claimed. The scope of the following claims is to be accorded the broadest interpretation so as to encompass all such modifications, equivalent structures and functions.

What is claimed is:

1. A magnetoresistive head, comprising:

a lower shield layer, an upper shield layer, a magnetoresistive element containing a thin film having a magnetoresistive effect located between the lower shield layer and the upper shield layer and having a portion exposed on a surface of the magnetoresistive head, a bias layer for supplying a bias to said thin film, a main electrode layer for supplying detected electric current to the magnetoresistive element, a lower gap layer located between said exposed portion of said magnetoresistive element and said lower shield layer, and an upper gap layer located between said exposed portion of said magnetoresistive element and said upper shield layer, wherein said lower gap layer and said upper gap layer are formed between the main electrode layer and the lower shield layer, and wherein said main electrode layer is electrically connected with said magnetoresistive element through a hole formed in the upper gap layer, 2. The magnetoresistive head according to claim 1, wherein said lower shield layer is formed from an iron-based fine-crystalline material having Fe as the main constituent, and includes one or more carbide crystals including a metal selected from the group consisting of Ti, Zr, Hf, V, Nb, Ta, Mo, and W, said carbide crystals having an average crystalline particle diameter of 40 nm or less.

3. A magnetoresistive head according to claim 1, further comprising:

an organic insulation layer formed on the main electrode layer, and an electrode lead-out layer formed on the organic insulation layer and connected to the main electrode layer through the organic insulation layer;

wherein the organic insulation layer is not exposed on the surface of the magnetoresistive head.

4. The magnetoresistive head according to claim 3, wherein the main electrode layer comprises one of Cu and W.

5. The magnetoresistive head according to claim 3, wherein the organic insulation layer comprises one of a novolak resin and a photosensitive polyimide resin.

6. The magnetoresistive head according to claim 1, further comprising:

an organic insulation layer located between the upper shield layer and the main electrode layer, wherein the upper and lower surfaces of the organic insulation layer converge at the upper surface of the upper gap layer in the portion facing the magnetic medium.

* * * * *